United States Patent
Huffmeyer

(10) Patent No.: US 6,463,866 B2
(45) Date of Patent: Oct. 15, 2002

(54) APPARATUS FOR VARYING THE RATE OF SEED POPULATION

(76) Inventor: Edward Huffmeyer, 365 E. County Rd. 700S, Greensburg, IN (US) 47240

( * ) Notice: Subject to any disclaimer, the term of this patent is extended or adjusted under 35 U.S.C. 154(b) by 0 days.

(21) Appl. No.: 09/733,264

(22) Filed: Dec. 8, 2000

(65) Prior Publication Data

US 2002/0069800 A1 Jun. 13, 2002

Related U.S. Application Data

(60) Provisional application No. 60/169,637, filed on Dec. 8, 1999, and provisional application No. 60/237,753, filed on Oct. 3, 2000.

(51) Int. Cl.⁷ .............................. A01C 7/18; F16H 55/56
(52) U.S. Cl. .............................. 111/177; 111/903; 474/8
(58) Field of Search ............................... 111/17, 28, 32, 111/77, 177, 903, 921, 904; 474/8, 159; 60/571, 572, 533; 221/13

(56) References Cited

U.S. PATENT DOCUMENTS

| | | | | |
|---|---|---|---|---|
| 966,303 A | * | 8/1910 | Borlase | 474/159 |
| 3,299,637 A | * | 1/1967 | Ballard | 60/572 |
| 3,579,989 A | * | 5/1971 | Stark et al. | 60/573 |
| 3,807,248 A | * | 4/1974 | Hooper | 474/28 |
| 4,078,504 A | * | 3/1978 | Tye | 111/77 |
| 4,122,974 A | * | 10/1978 | Harbert et al. | 221/13 |
| 4,455,812 A | * | 6/1984 | James | 56/11.5 |
| 4,872,310 A | * | 10/1989 | Kaye | 60/572 |
| 4,944,713 A | * | 7/1990 | Salerno | 474/8 |
| 5,201,687 A | * | 4/1993 | Friedmann | 474/18 |
| 5,646,846 A | * | 7/1997 | Bruce et al. | 111/903 |
| 5,685,245 A | * | 11/1997 | Bassett | 111/62 |
| 5,846,152 A | * | 12/1998 | Taniguchi et al. | 475/210 |
| 5,941,789 A | * | 8/1999 | McCarrick et al. | 475/214 |
| 5,956,255 A | * | 9/1999 | Flamme | 111/903 |
| 6,036,616 A | * | 3/2000 | McCarrick et al. | 475/214 |
| 6,379,275 B1 | * | 4/2002 | Serkh | 474/100 |

FOREIGN PATENT DOCUMENTS

WO    WO 86/04209    *    7/1986

OTHER PUBLICATIONS

Prior Art Statement of the Inventor.
John Deere Monitrol System, Feb. 22, 1988, pp. 1, 16 and 18, PC1603.

* cited by examiner

Primary Examiner—Thomas B. Will
Assistant Examiner—Nathan Mammen
(74) Attorney, Agent, or Firm—Clifford W. Browning; Woodard, Emhardt, Naughton, Moriarty & McNett

(57) ABSTRACT

An apparatus for varying the rate of seed population by planters or drills, comprising first and second squeeze jack variable speed pulleys, and a belt running around the pulleys; a cog mounted on the first pulley and a cog mounted on the second pulley, and a drive chain running around the cog mounted on the first pulley and a row unit chain running around the cog mounted on the second pulley; and apparatus to vary selectively the speed of the row unit chain at any given speed of the drive chain.

4 Claims, 1 Drawing Sheet

APPARATUS FOR VARYING THE RATE OF SEED POPULATION

This application claims the benefits of prior co-pending provisional patent applications Serial No. 60/169,637 filed Dec. 8, 1999 and No. 60/237,753, filed Oct. 3, 2000.

The present invention relates generally to systems for regulating the seed population rates by planters or drills, and more particularly to a novel apparatus that will vary the rate of seed population by planters or drills while they are in motion.

SUMMARY OF THE INVENTION

The apparatus for varying the rate of seed population by planters or drills of the present invention enables farmers to vary the rate of seed population by planters or drills of the prior art without stopping the planter to change the well-known planter-wheel-driven sprockets that now select the planter's seed population rate.

For example, a farmer will prefer to plant less corn seed on lighter soils, which are typically found on hillsides or slopes, and more corn seed on darker soils to thereby improving overall crop yields. When planting soybeans, on the other hand, just the opposite is true. A farmer would want to plant a heavier population of seeds on lighter soils and less on darker soils, because there would be less lodging of soybeans on the better soils.

Varying the seeding rate also enhances soil and water quality. For example, a stronger, healthier corn stalks on the hillside result from a lower seed population, and there is less soil erosion as a result. At the bottom of the hillsides, and on the flats, where the seed population is higher, water run-off is slowed because on the darker soils one gets a better plant. For soybeans, one would prefer having a heavier seed population on the hills, therefore, slowing water run-off.

The apparatus for varying the rate of seed population of the present invention accommodates a change from planting corn to planting soybeans or wheat, or any of the small grains, all without changing a sprocket on the planter or drill, as has been required in the prior art.

The apparatus of the present invention is also very safe for farmer-operators, because all changes may be made from the seat of the tractor that is pulling the planter.

The main goal of the present invention is to provide the farmer with means to place more or less seed in the most appropriate areas of the field, thereby saving money in seed cost and creating a better yield with less soil erosion.

A linear actuator that is connected to a hydraulic double rod cylinder controls the apparatus of the present invention. This enables the unit to select many different rates of seed population and to change the seed population rate at any point in time immediately. The actuator and the cylinder are located inside a single frame for the apparatus of the present invention, thereby making a compact unit that may be retrofitted to existing planters or drills.

The apparatus of the present invention may also be wired to a switch located in a tractor cab that controls the seeding population rate, or it can be wired to a seed population monitor for a planter or drill located in the tractor cab. The apparatus of the present invention is especially useful on a drill because a drill varies its seed population rate frequently due to the presence of different seed sizes and weights. The apparatus of the present invention allows the operator to correct this problem by holding a steady population rate using the switch or monitor. Therefore, the apparatus of the present invention can be used to hold the rate of seed population steady or get unlimited numbers of seed populations.

Another useful way to use the apparatus of the present invention is with fertilizer applications. Many times fertilizer population rates are varied according to soil types. The apparatus of the present invention could be used in many such applications that require speed variation.

This system could be equipped with a leveler. This would allow the apparatus to change seed population rates automatically as percent of ground slope increased and decreased. The apparatus could also be integrated with GPS which would allow mappings to illustrate where the apparatus of the present invention varied seed population rates, or GPS could be programmed to effect a change in seed population rates automatically.

One embodiment of the present invention is an apparatus for varying the rate of seed population by planters or drills, comprising, first and second squeeze jack variable speed pulleys, each having a top half and a bottom half, with the first pulley spinning about a first axis and the second pulley spinning about a second axis, a first oil-actuated squeeze jack affixed to the bottom half of the first pulley that moves the bottom half of the first pulley along its axis from a first position in which the first pulley is closed to a second position in which the first pulley is opened, and a second oil-actuated squeeze jack affixed to the bottom half of the second pulley that moves the bottom half of the second pulley along its axis from a first position in which the second pulley is closed to a second position in which the second pulley is opened, and a belt running around the pulleys; a drive cog affixed to the top half of the first pulley with a drive chain running around the drive cog, and a row unit cog affixed to the top half of the second pulley with a row unit chain running around the row unit cog; a double-rod oil cylinder in fluid communication in a closed system with the first and second squeeze jacks and having a piston therein that is movable between a first position at which the bottom half of the first pulley is in its second position and opened, and the bottom half of the second pulley is in its first position and is closed, and a second position at which the bottom half of the first pulley is in its first position and is closed, and the bottom half of the second pulley is in its second position and is opened; and apparatus to move the piston between its first and second positions and to positions in-between.

Another embodiment of the present invention is an apparatus for varying the rate of seed population by planters or drills, comprising first and second squeeze jack variable speed pulleys, and a belt running around the pulleys; a cog mounted on the first pulley and a cog mounted on the second pulley, and a drive chain running around the cog mounted on the first pulley and a row unit chain running around the cog mounted on the second pulley; and apparatus to vary selectively the speed of the row unit chain at any given speed of the drive chain.

Related objects and advantages of the present invention will be apparent from the following descriptions.

BRIEF DESCRIPTION OF THE DRAWING FIGURES

DETAIL DESCRIPTION OF THE PREFERRED EMBODIMENT

Figure 1:
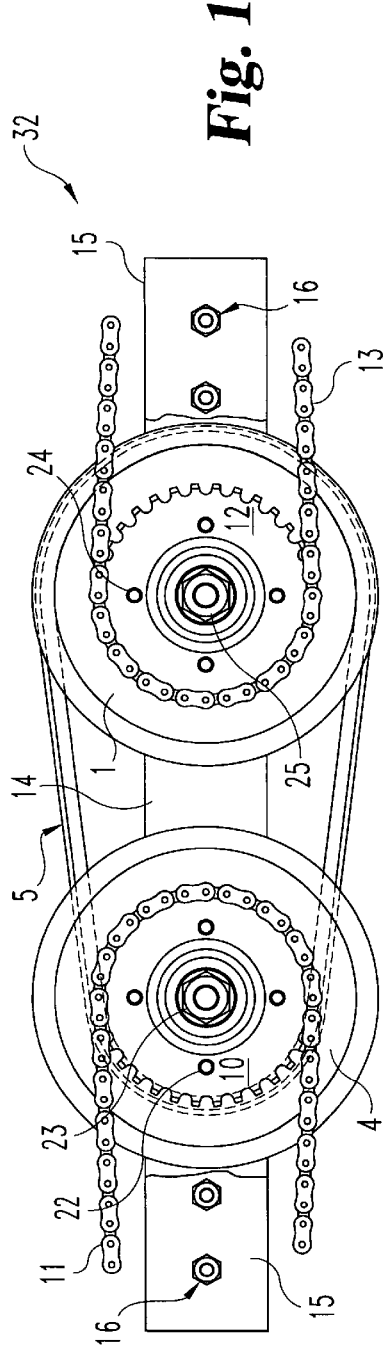
FIG. 1 is a partially segmented top view of the apparatus for varying the rate of seed population by planters or drills of the present invention.
Figure 2:
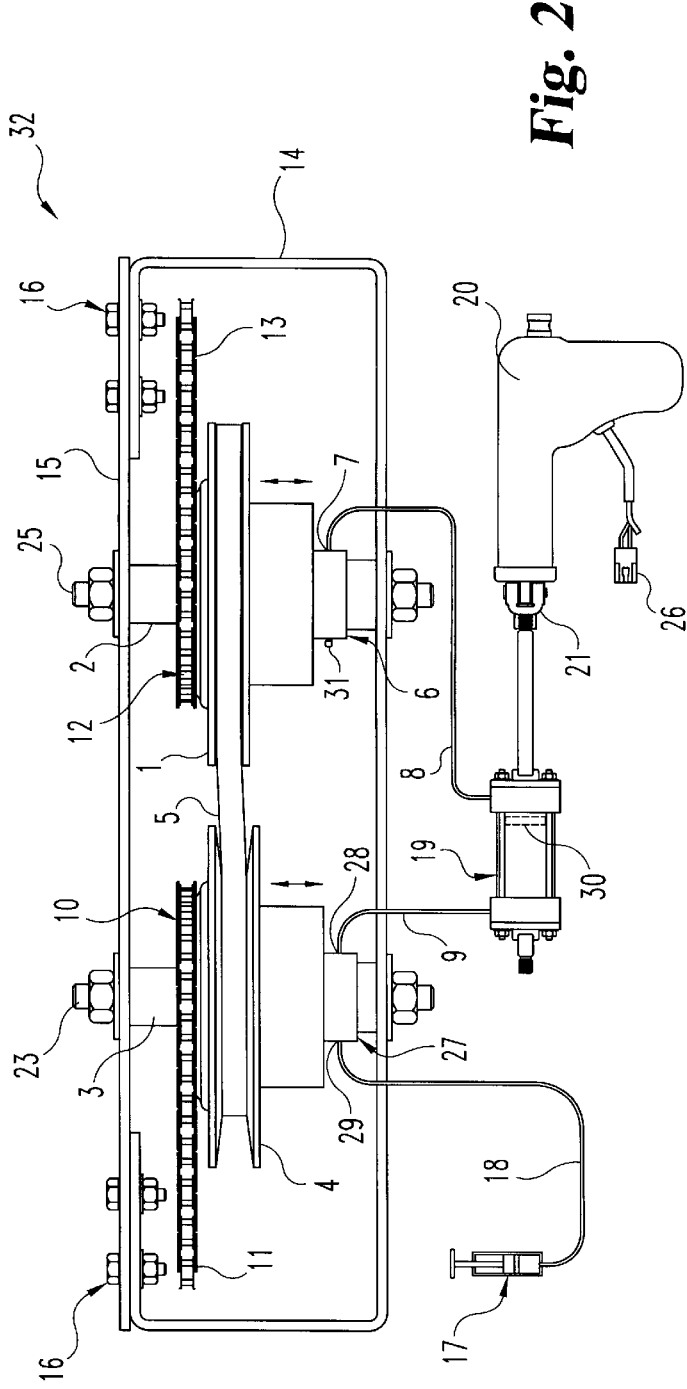
FIG. 2 is a front view of the apparatus of FIG. 1.

Referring now to the drawings, a preferred embodiment to date of the apparatus for varying the rate of seed population (32) of the present invention is illustrated in FIGS. 1 and 2.

The apparatus consists of a first 8.5-inch diameter squeeze jack variable speed pulley (1) and a second 8.5-inch squeeze jack variable speed pulley (4). A ⅞-inch belt (5) measuring 44 inches long is used to interconnect and power the two pulleys (1, 4). An oil actuated squeeze jack (6) on variable speed pulley (1) has an oil connector (7) through which oil activates the squeeze jack (6), making the lower half of the variable speed pulley (1) move either up or down in the view FIG. 2. A plug (31) allows excess oil to be drained from variable speed pulley (1). Variable speed pulley (4) has a corresponding squeeze jack (27) and an oil connector (28) that operate in the same ways.

Variable speed pulley (1) and variable speed pulley (4) are exactly the same size and operate the same way. A ¼ inch oil line (8) connects to the front port hole of double-rod oil cylinder (19), which has a ¾ inch bore, a 5/16 inch rod, and a 6 inch stroke, and holds approximately 2.190 cubic inches of oil. By contrast, squeeze jacks (6, 27) hold approximately 2.208 cubic inches of oil, each.

When cylinder (19) is charged with oil on both sides, its piston (30), located inside cylinder (19), should be in the center of the cylinder (19). Squeeze jacks (6, 27) are charged half full with approximately 1.104 cubic inches of oil each. Oil lines (8) and (9) are charged with oil also. A hand screw adjuster (17), which is a ½ inch threaded bolt, 3 inches long, threaded into a ½ inch cylinder with an o-ring, and oil line (18) connecting the adjuster to squeeze jack (27) through connector (29), are each charged with oil so that when hand screw adjuster (17) is tightened down it puts oil pressure on both squeeze jacks (6, 27), which then move the bottom halves of variable speed pulleys (1) and (4) (See FIG. 2) upward, closing each, and thereby tightening belt (5) between them.

When linear actuator (20), which is connected to clevis 21, which in turn is screwed onto cylinder (19), is retracted, there will be an increase in the seed population rate or speed, and when actuator (20) is advanced, the seed population rate or speed will be decreased, for the reasons that will be more fully explained below when the operation of the present invention is explained.

A drive cog (12), 5½ inch in diameter with 4 holes 5/16 inches each for stud bolts (24), is mounted to the variable speed pulley (1) on the side thereof opposite to squeeze jack (6). A drive chain (13) powers drive cog (12), and drive chain 13 is powered by a conventional wheel driven cog of a planter or drill (not shown). Thus, the speed of drive chain (13), and the corresponding rate of rotation of drive cog (12), will be directly proportional to the speed of the planter or drill over the ground. At any given ground speed of the planter or drill, the speed of drive chain (13) and the corresponding rate of rotation of drive cog (12) will remain constant.

A row unit cog (10), 5½ inch in diameter with 4 holes 5/16 inches each for stud bolts (22), is similarly mounted to variable speed pulley (4) and row unit chain (11) around the row unit cog (10) is connected to a conventional drive cog of the row units of a planter or drill. It is the rate of rotation of the conventional drive cog of the row units of a planter or drill that determines the speed or rate of seed population by the planter or drill.

A flat steel frame (14, 15) is provided in the preferred embodiment to date consisting of frame member (14) and frame bar (15). Frame member (14) is 3/16 inch thick and 3 inches wide flat steel that is bent on its four corners to measure 6¾ inches deep and 26¾ inches long. Frame bar (15) is 3/16 inch thick and 3 inch wide flat steel that is 26¾ inches long, with two trough holes at each end, one 1½ inches away from each end and the other 4 inches away from each end, for four bolts (16), each ⅝ inches wide and 1 inch long with nut sand lock washers, that hold frame member (14) and frame bar (15) together. Variable speed pulleys (1, 4) are mounted to frame bar (15) so as to be within the frame (14, 15), each being 8¾ inches from each end of the frame (14, 15), leaving the variable speed pulleys (1, 4) 10 inches apart. Actuator (20) and cylinder (19) are also to be mounted within frame (14, 15), but are shown outside the frame in FIG. 2 for clarity. It can be appreciated that frame bar (15) may be unbolted and taken off to make assembly and repairs convenient.

The four 5/16 inch stud bolts (22) hold cog (10) to variable speed pulley (4). One ⅝" bolt (23), threaded on both ends, holds variable speed pulley (4) to the flat steel frame (14, 15). Four 5/16 inch stud bolts (24) hold cog (12) to variable speed pulley (1). One ⅝-inch bolt (25), threaded on both ends, holds variable speed pulley (1) to flat steel frame (14, 15). Sleeve (3) is held by ⅝-inch bolt (23) next to frame (14, 15). A ⅝-inch bolt (25) holds sleeve (2) to the flat steel frame (14, 15).

Operation of the preferred embodiment of the apparatus of the present invention as illustrated in FIGS. 1 and 2 is as follows. When actuator (20), which is connected to cylinder (19), is retracted up to 6 inches, as illustrated in FIG. 2, piston (30) pushes all the oil that had been in the cylinder on the actuator side of piston 30 through oil line (8) and has filled squeeze jack (6), which pushes the lower half of variable speed pulley (1) upwards until variable speed pulley (1) is fully closed, as illustrated in FIG. 2. Belt 5 is then rotating about the outer circumference of variable speed pulley (1), as illustrated in FIG. 2.

At this point, piston (30) has also pulled oil through (9) oil line from squeeze jack (27) until all the oil is out of squeeze jack (27), and the oil is in cylinder (19), which is now full of oil. The lower half of variable speed pulley (4) moves downward until variable speed pulley (4) is fully open, as illustrated in FIG. 2. Belt (5) then slips within variable speed pulley (4), as illustrated in FIG. 2, is turning about a smaller radius, which has the effect of increasing the rate of rotation of the variable speed pulley (4). This operation in turn has the effect of increasing the rate of rotation of row unit cog 10, while the rate of rotation of drive cog 12 remains constant, which speeds up row unit chain 11, which in turn increases the speed or rate of seed population.

To decrease the speed or rate of seed population, actuator (20) is advanced and piston (30) will travel to the opposite end of cylinder (19) to that illustrated in FIG. 2. This pulls oil out of squeeze jack (6) through oil line (8) and into cylinder (19) thereby dropping the lower half of variable speed pulley (1) and thus opening it. This also pushes oil back through oil line (9) to squeeze jack (27), pushing the lower half of variable speed pulley (4) upward. This action closes variable speed pulley (4). As a result, belt 5 is squeezed outwardly to the outer circumference of variable speed pulley (4), while belt (5) slips within variable speed pulley (1) and thus turns about a smaller radius. Whereas variable speed pulley (1) continues to rotate at a constant rate, the effect of the foregoing actions is to decrease the rate of rotation of the variable speed pulley (4), which slows the rate of rotation of row unit cog (10), which slows down row unit chain 11, which in turn decreases the speed or rate of seed population.

In a manner similar to the forgoing examples, the actuator (20) may be stopped at any intermediary position to those discussed above to vary the speed or rate of population of seeds to any desired level between the positions of maximum increase and decrease discussed above.

An electrical sensor (26) on actuator (20) provides an electrical connection between the actuator (20) and a control unit that will enable a farmer to vary selectively the position of piston (30) within cylinder (19). For examples, the control unit might be a simple toggle switch, or a seed population monitor/controller, or a controller that would respond to the degrees of inclination of the planter or drill, or to a GPS controller that would vary seed population rates based on the GPS-determined location of the planter or drill in the field, any of which would be mounted in the cab of the tractor pulling the planter or drill.

I claim:

1. An apparatus for varying the rate of seed population by planters or drills, comprising:

first and second squeeze jack variable speed pulleys, each having a top half and a bottom half, with the first pulley spinning about a first axis and the second pulley spinning about a second axis, a first oil-actuated squeeze jack affixed to the bottom half of the first pulley that moves the bottom half of the first pulley along its axis from a first position in which the first pulley is closed to a second position in which the first pulley is opened, and a second oil-actuated squeeze jack affixed to the bottom half of the second pulley that moves the bottom half of the second pulley along its axis from a first position in which the second pulley is closed to a second position in which the second pulley is opened, and a belt running around the pulleys;

a drive cog affixed to the top half of the first pulley with a drive chain running around the drive cog, and a row unit cog affixed to the top half of the second pulley with a row unit chain running around the row unit cog;

a double-rod oil cylinder in fluid communication in a closed system with the first and second squeeze jacks and having a piston therein that is movable between a first position at which the bottom half of the first pulley is in its second position and opened, and the bottom half of the second pulley is in its first position and is closed, and a second position at which the bottom half of the first pulley is in its first position and is closed, and the bottom half of the second pulley is in its second position and is opened; and means to move the piston between its first and second positions and to positions in-between wherein said means includes a linear actuator having a clevis that is attached to a double-rod cylinder.

2. The apparatus for varying the rate or seed population by planters or drills of claim 1 wherein said linear actuator has an electrical sensor that is connectable to a control for the actuator selected from the group consisting of a toggle switch, a seed population monitor, an inclination monitor, and a Global Positioning System monitor.

3. An apparatus for varying the rate of seed population by planters or drills, comprising:

first and second squeeze jack variable speed pulleys, and a belt running around the pulleys;

a cog mounted on the first pulley and a cog mounted on the second pulley, and a drive chain running around the cog mounted on the first pulley and a row unit chain running around the cog mounted on the second pulley; and means to vary selectively the speed of the row unit chain at any given speed of the drive chain wherein said means includes a linear actuator having a clevis that is attached to a double-rod cylinder.

4. The apparatus for varying the rate of seed population by planters or drills of claim 3 wherein said linear actuator has an electrical sensor that is connectable to a control for the actuator selected from the group consisting of a toggle switch, a seed population monitor, an inclination monitor, and a Global Positioning System monitor.

* * * * *